United States Patent
Tanaka et al.

(10) Patent No.: US 11,317,624 B2
(45) Date of Patent: **\*May 3, 2022**

(54) AQUEOUS HERBICIDAL COMPOSITIONS AND METHODS OF USE THEREOF

(71) Applicant: Valent U.S.A. LLC, Walnut Creek, CA (US)

(72) Inventors: Takuya Tanaka, Takarazuka (JP); Ke Zhou, San Ramon, CA (US)

(73) Assignee: VALENT U.S.A., LLC, Walnut Creek, CA (US)

(*) Notice: Subject to any disclaimer, the term of this patent is extended or adjusted under 35 U.S.C. 154(b) by 206 days.

This patent is subject to a terminal disclaimer.

(21) Appl. No.: 16/140,915

(22) Filed: Sep. 25, 2018

(65) Prior Publication Data

US 2019/0098893 A1 Apr. 4, 2019

Related U.S. Application Data

(60) Provisional application No. 62/566,007, filed on Sep. 29, 2017.

(51) Int. Cl.
| | | |
|---|---|---|
| *A01N 25/04* | (2006.01) | |
| *A01N 25/22* | (2006.01) | |
| *A01N 25/10* | (2006.01) | |
| *A01N 43/90* | (2006.01) | |
| *A01N 43/84* | (2006.01) | |
| *A01N 57/20* | (2006.01) | |
| *A01N 25/06* | (2006.01) | |

(52) U.S. Cl.
CPC ............ *A01N 25/04* (2013.01); *A01N 25/06* (2013.01); *A01N 25/10* (2013.01); *A01N 25/22* (2013.01); *A01N 43/84* (2013.01); *A01N 43/90* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 2007/0066486 A1* | 3/2007 | Kawanaka | A01N 57/20 504/206 |
| 2008/0274154 A1* | 11/2008 | Bussmann | A01N 47/30 424/405 |
| 2013/0143741 A1 | 6/2013 | Wright et al. | |
| 2015/0141249 A1 | 5/2015 | Anderson et al. | |
| 2017/0035046 A1 | 2/2017 | Goyal et al. | |
| 2017/0049098 A1 | 2/2017 | Klimov et al. | |

FOREIGN PATENT DOCUMENTS

WO 2017083409 A2 5/2017

OTHER PUBLICATIONS

International Search Report and Written Opinion dated Dec. 27, 2018.

* cited by examiner

*Primary Examiner* — John Pak
*Assistant Examiner* — Daniel L Branson
(74) *Attorney, Agent, or Firm* — Wood, Phillips, Katz, Clark & Mortimer

(57) ABSTRACT

The present invention is directed to an aqueous herbicidal composition containing one or more low water solubility herbicides, hydroxyethyl cellulose, and an inorganic compound selected from the group consisting of silicon dioxide, aluminum oxide, magnesium aluminum silicate, attapulgite and mixtures thereof. The present invention is further directed to a method of controlling weeds by applying compositions of the present invention.

4 Claims, No Drawings

AQUEOUS HERBICIDAL COMPOSITIONS AND METHODS OF USE THEREOF

FIELD OF THE INVENTION

The present invention relates to aqueous herbicidal compositions containing one or more low water solubility herbicides, hydroxyethyl cellulose, and an inorganic compound selected from the group consisting of silicon dioxide, aluminum oxide, magnesium aluminum silicate, attapulgite and mixtures thereof. The present invention further relates to a method of controlling weeds by applying compositions of the present invention.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (Conyza canadensis) control in no-tillage soybeans (Glycine max) with preplant and preemergence herbicides, Weed Techno, 1990, 4, 642-647. Therefore, controlling weeds is a major concern of crop growers. Unwanted plants in crop plant environments include broadleaves, grasses and sedges.

Roundup Powermax® (available from Monsanto Technology LLC) has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Flumioxazin is a protoporphyrinogen oxidase ("PPO") inhibitor herbicide, which is a different mode of action from glyphosate, used to control weeds among soybeans, peanuts, orchard fruits and many other agricultural crops in the United States and worldwide. Flumioxazin is effective in controlling glyphosate resistant and tough-to-control weeds.

As mentioned above, one way to control resistant weeds is to apply multiple herbicides sequentially or concurrently. Often, when multiple herbicides are applied concurrently they are added as suspension concentrates and oil-in-water-emulsions to form a tank mix prior to application. However, when adding multiple herbicide formulations to form a tank mix the user must ensure that the formulations are stable and are mixed properly to ensure compatibly such that precipitation of the active ingredients do not occur. Physical incompatibility among herbicide formulations result in precipitation of one or all of the herbicides or excipients during tank mixing resulting in poor spray characteristics such as clogging spray nozzle and uneven coverage, thus reducing the benefits of the co-application. Despite its popularity, many current low water solubility herbicide aqueous suspension and emulsion formulations are not physically compatible with Roundup Powermax®.

Accordingly, there is a need in the art for low water solubility herbicide aqueous suspension and emulsion compositions that are storage stable and compatible with Roundup Powermax®.

SUMMARY OF THE INVENTION

In one embodiment, the present invention is directed to aqueous herbicidal compositions comprising from about 0.10% to about 50% w/w of one or more low water solubility herbicides, hydroxyethyl cellulose, and an inorganic compound selected from the group consisting of silicon dioxide, aluminum oxide, magnesium aluminum silicate, attapulgite and mixtures thereof.

In another embodiment, the present invention is directed to methods of controlling weeds comprising applying a composition of the present invention to the weeds or an area in need of weed control.

DETAILED DESCRIPTION OF THE INVENTION

Applicant discovered specific thickener combinations that are capable of physically stabilizing low water solubility herbicide suspension and emulsion compositions without the occurrence of any gelling and or caking. These compositions are stable over a long duration resulting in long shelf life and ease of use after storage. Further, these compositions are physically compatible with Roundup Powermax® herbicide such that the mixture does not clog the spray nozzle and provides even coverage.

In one embodiment, the present invention is directed to an aqueous herbicidal composition comprising from about 0.10% to about 50% w/w of one or more low water solubility herbicides, hydroxyethyl cellulose, and an inorganic compound selected from the group consisting of silicon dioxide, aluminum oxide, magnesium aluminum silicate, attapulgite and mixtures thereof.

In another embodiment, the compositions of the present invention do not contain xanthan gum or methyl celluloses, including methylhydroxypropyl cellulose. In another embodiment, the compositions of the present invention do not contain magnesium aluminum silicate. In another embodiment, the compositions of the present invention do not contain lactofen or dicamba.

In a preferred embodiment, hydroxyethyl cellulose may be present at a concentration from about 0.010% to about 1.0% w/w, more preferably from about 0.050% to about 0.50% w/w and even more preferably from about 0.10% to about 0.30% w/w.

In another preferred embodiment, the inorganic compound may be present at a concentration from about 0.10% to about 5.0% w/w and more preferably from about 0.10% to about 3.0% w/w.

In another preferred embodiment, magnesium aluminum silicate may be present at a concentration from about 0.10% to about 3.0% w/w and more preferably from about 0.10% to about 1.0% w/w.

In another preferred embodiment, attapulgite may be present at a concentration from about 0.10% to about 3.0% w/w and more preferably from about 0.10% to about 1.0% w/w.

In another preferred embodiment, silicon dioxide may be present at a concentration from about 0.10% to about 3.0% w/w and more preferably from about 0.50% to about 2.0% w/w.

In another preferred embodiment aluminum oxide may be present at a concentration from about 0.10% to about 3.0% w/w and more preferably from about 0.10% to about 0.75% w/w.

In a preferred embodiment, the one or more low water solubility herbicides may be present at a concentration from about 0.1% to about 50% w/w, more preferably from about 1% to about 50% w/w, even more preferably from about 10% to about 50% w/w, yet more preferably from about 20% to about 50% w/w, yet even more preferably from about 30% to about 50% w/w, and most preferably from about 40% to about 50% w/w.

In a more preferred embodiment, the one or more low water low solubility herbicides is a PPO inhibitor herbicide. PPO inhibitor herbicides useful for the present invention include, but are not limited to, acifluorfen-sodium, fomesafen, lactofen, oxyfluorfen, flumiclorac, flumioxazin, oxadiazon, saflufenacil, fluthiacet-methyl, carfentrazone-ethyl and sulfentrazone.

In a more preferred embodiment, the one or more water low solubility herbicides is flumioxazin.

In a yet more preferred embodiment, flumioxazin is at a concentration from about from about 0.10% to about 50% w/w, more preferably from about 1.0% to about 50% w/w, even more preferably from about 10% to about 50% w/w, yet even more preferably from about 20% to about 50% w/w, yet even more preferably from about 30% to about 50% w/w, yet even more preferably from about 40% to about 50% w/w and most preferably about 44% w/w.

Compositions of the present invention may further comprise one or more excipients selected from the group consisting of a dispersant, an antifoaming agent, an antifreeze agent and a preservative.

Dispersants suitable for use in the present invention include, but are not limited to, acrylic graft copolymers and a potassium salt of polyoxyethylene tristyrylphenol phosphate.

In another preferred embodiment, the 35% acrylic graft copolymer may be present at a concentration from about 0.10% to about 10% w/w, from about 1.0% to about 5.0% w/w or about 4.5% w/w.

In another preferred embodiment, the 35% acrylic graft copolymer has a density of 1.07 g/mL at 25° C., a flash point of greater than 100° C., a pour point of less than 0° C. and a viscosity of 200 mPa·s at 25° C.

In another preferred embodiment, the potassium salt of polyoxyethylene tristyrylphenol phosphate may be present at a concentration from about 0.10% to about 10% w/w, even more preferably from about 1.0% to about 5.0% w/w and most preferably about 3.0% w/w.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols and mixtures thereof. In a preferred embodiment, the antifoaming agent is a silicone emulsion. Antifoaming agents may be present at a concentration from about 0.010% to about 1.0% w/w, preferably from about 0.050% to about 0.50% w/w and more preferably about 0.10% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. In a preferred embodiment, the antifreeze agent is propylene glycol. Antifreeze agents may be present at a concentration from about 1.0% to about 10% w/w, preferably from about 2.0% to about 9.0% w/w, more preferably from about 3.0% to about 8.0% w/w and most preferably about 7.0% w/w.

Preservatives suitable for use in the present invention include, but are not limited to, a 1.15% 5-chloro-2-methyl-4-isothiazolin-3-one and 0.35% 2-methyl-4-isothiazolin-3-one solution in water, such as Kathon® CG/ICP (available from Rohm and Haas Company) and Legend MK® (available from Rohm and Haas Company), 19.3% 1,2-benzisothiazolin-3-one and a mixture of 1,2-benzisothiazolin-3-one and 6.5% 2-bromo-2-nitro-1,3-propanediol. In a preferred embodiment the preservative is 1,2-benzisothiazolin-3-one. Preservatives may be present at a concentration from about 0.010% to about 1.0% w/w, preferably from about 0.010% to about 0.50% w/w, and more preferably about 0.050% w/w.

In a preferred embodiment, the present invention is directed to an aqueous herbicidal suspension composition comprising:
  about 44% w/w flumioxazin;
  about 4.5% w/w of a 35% acrylic graft copolymer;
  about 3.0% w/w of a potassium salt of polyoxyethylene tristyrylphenol phosphate;
  about 0.10% w/w of a silicone emulsion;
  about 0.050% w/w of 19.3% 1,2-benzisothiazolin-3-one;
  about 7.0% w/w propylene glycol;
  from about 0.15 to about 0.30% w/w hydroxyethyl cellulose; and
  and an inorganic compound selected from the group consisting of from about 0.50% to
  about 2.0% w/w silicon dioxide, from about 0.10% to about 0.75% w/w aluminum oxide,
  about 1.0% w/w magnesium aluminum silicate, about 1.0% w/w attapulgite and mixtures thereof.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

The term "low water solubility" as used herein means having solubility in deionized water of less than about 10,000 parts per million at 25° C.

Low water low solubility herbicides suitable for use in the present invention include, but are not limited to: aryloxy-phenoxy-propionate compounds such as cyhalofop-butyl, fluazifop-P-butyl, and quizalofop-p-ethyl; cyclohexane-dione compounds such as sethoxydim, tepraloxydim, and clethodim; sulfonylurea compounds such as bensulfuron-methyl, imazosulfuron, sulfosulfuron, ethametsulfuron-methyl, halosulfuron-methyl, flazasulfuron, nicosulfuron, rimsulfuron, and chlorimuron-ethyl; imidazolinone compounds such as imazethapyr; triazolopyrimidine compounds such as penoxsulam, and florasulam; dinitroaniline compounds such as trifluralin, pendimethalin, and oryzalin; phenoxy-carboxylic-acid compounds such as dichlorprop, methyl chlorophenoxypropionic acid ("MCPP"), 4-(4-chloro-2-methylphenoxy)butanoic acid ("MCPB"), and triclopyr; triazine compounds such as simazine, atrazine, prometryn, and cyanazine; triazinone compounds such as metribuzin; uracil compounds such as lenacil, terbacil, and bromacil; phenyl-carbamate compounds such as phenmedipham, and desmedipham; nitrile compounds such as ioxynil, and dichlobenil; benzothiadiazinone compounds such as bentazon; urea compounds such as diuron, linuron, siduron, isouron, and tebuthiuron; thiocarbamate compounds such as thiobencarb, and molinate; pyridinecarboxamide compounds such as diflufenican; diphenylether compounds such as bifenox, chlomethoxyfen, fluoroglycofen-ethyl, fomesafen, halosafen, lactofen, and oxyfluorfen; phenylpyrazole compounds such as fluazolate, and pyraflufen-ethyl; N-phenylphthalimide compounds such as cinidon-ethyl, flumioxazin, and flumiclorac-pentyl; thiadiazole compounds such as fluthiacet-methyl, and thidiazimin; oxadiazole compounds such as oxadiazon, and oxadiargyl; triazolinone compounds such as azafenidin, carfentrazone-ethyl, and sulfentrazone; oxazolidinedione compounds such as pentoxazone; pyrimidindione compounds such as benzfendizone, and butafenacil; chloroacetamide compounds such as alachlor, butachlor, and metolachlor; acetamide compounds such as napropamide.

Compositions of the present invention may further comprise one or more low water solubility insecticide or fungicide.

Low water solubility insecticide suitable for use in the present invention include, but are not limited to: carbamate compounds such as carbosulfan, thiodicarb, and carbaryl; organophosphoate compounds such as, fenthion, fenitrothion, dichlofenthion, pirimiphos-methyl, diazinon, chlorpyrifos, phosalone, profenofos, and methidathion; phenylpyrazole compounds such as fipronil, and ethiprole; pyrethroid compounds such as pyrethrin, allethrin, permethrin, cypermethrin, cyhalothrin, cyfluthrin, tralomethrin, fenpropathrin, bifenthrin, fenvalerate, esfenvalerate, flucythrinate, fluvalinate, and deltamethrin; neonicotinoid compounds such as thiacloprid, clothianidin, imidacloprid, acetamiprid, and thiamethoxam; benzoylurea compounds such as diflubenzuron, teflubenzuron, lufenuron, and novaluron; diacylhydrazine compounds such as tebufenozide, and methoxyfenozide; diamide compounds such as flubendiamide, chlorantraniliprole, and cyantraniliprole; spinosad, emamectin benzoate, milbemectin, pyriproxyfen, pymetrozine, etoxazole, diafenthiuron, chlorfenapyr, buprofezin, tolfenpyrad, indoxacarb, metaflumizone, flonicamid, and pyridalyl. Low water solubility fungicides suitable for use in the present invention include, but are not limited to: benzimidaazole compounds such as thiophanate-methyl, and benomyl; imidazole compounds such as triflumizole, and prochloraz; triazole compounds such as myclobutanil, propiconazole, tetraconazole, triadimefon, fenbuconazole, hexaconazole, tebuconazole, difenoconazole, ipconazole, cyproconazole, and metconazole; phenylamide compounds such as metalaxyl; organophosphorus compounds such as iprobenfos, edifenphos, and tolclofos-methyl; anilino-pyrimidine compounds such as mepanipyrim, and cyprodinil; strobilurin compounds such as trifloxystrobin, kresoxim-methyl, pyraclostrobin, azoxystrobin, mandestrobin, famoxadone, and fenamidone; organosulfur compounds such as ziram, maneb, and mancozeb; iprodione, fenarimol, triforine, isoprothiolane, flutolanil, boscalid, penthiopyrad, diethofencarb, fludioxonil, tricyclazole, fenhexamid, fenpyrazamine, cyazofamid, amisulbrom, ethaboxam, cymoxanil, fluazinam, mandipropamid, fluopicolide, cyflufenamid, captan, chlorothalonil, dithianon, and chinomethionat.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

Compositions of the Invention

|  | Composition 1 |
| --- | --- |
| Flumioxazin | 44.0% |
| Acrylic graft copolymer (35%) | 4.5% |
| Polyoxyethylene tristyrylphenol phosphate, potassium salt | 3.0% |
| Silicone emulsion | 0.10% |
| 19.3% 1,2-benzisothiazolin-3-one | 0.050% |
| Propylene Glycol | 7.0% |
| Thickener System | 0.75%-3.60% |
| Water | Q.S. |

Terspserse® 2500 is used as the source of 35% graft copolymer and is available from Huntsman Petrochemical Corporation.

Stepfac™ TSP PE-K (CAS #163436-84-8) is used as the source of polyoxyethylene tristyrylphenol phosphate, potassium salt and is available from Stepan Corp.

Antifoam 30 FG is used as the source of silicone emulsion antifoaming agent and is available from Performance Chemicals, LLC.

Proxel® GXL is used as the source of 19.3% 1,2-benzisothiazolin-3-one and is available from Arch Chemicals, Inc.

TABLE 2

| Formulation X | |
|---|---|
| | Formulation X |
| Flumioxazin | 44.0% |
| Atlox ® 4913 | 4.0% |
| Atlox ® 4894 | 2.0% |
| SAG 30 | 0.10% |
| Proxel ® BN | 0.10% |
| Propylene Glycol | 6.0% |
| Rhodopol ® 23 | 0.15% |
| Attagel ® 50 | 0.30% |
| Water | Q.S. |

Atlox® 4913 is 35% graft copolymer and is available from Croda Americas LLC.

Atlox® 4894 is an alkylphenol ethoxylate free nonionic wetter and is available from Croda Americas LLC.

SAG 30 is a polydimethylsiloxane emulsion containing 3-7% of a proprietary fatty acid ethoxylate.

Proxel® BN is an aqueous solution of 13.5% 1,2-benzisothiazolin-3-one and 6.5% 2-bromo-2-nitro-1,3-propanediol.

Rhodopol® 23 is a xanthan gum (CAS #11138-6-2) available from Solvay.

Attagel® 50 is an inert attapulgite clay powder and is available from BASF.

Example 1—Process for Preparation of Compositions of the Invention

Process 1

Hydroxyethyl cellulose was dissolved in alkali water to create a hydroxyethyl cellulose solution. Inorganic compounds were dispersed in water under high-shear agitation to create an inorganic compound dispersion. Excipients including a dispersant, an antifoaming agent, an antifreeze agent and a preservative were dissolved or dispersed in water under continuous agitation until the composition was homogenous. Once homogenous, one or more low water solubility herbicides was added to the composition. After mixing under high-shear agitation, the composition was wet milled to a median particle size of about 2 micrometers ("µM") using zirconia beads to create a mill base. The hydroxyethyl cellulose solution and the inorganic compound dispersion were then sequentially added to the mill base.

Process 2

Hydroxyethyl cellulose was dissolved in alkali water to create a hydroxyethyl cellulose solution. Inorganic compounds and additional excipients including a dispersant, an antifoaming agent, an antifreeze agent and a preservative were dissolved or dispersed in water under continuous agitation until the composition was homogenous. Once homogenous, one or more low water solubility herbicides was added to the composition. After mixing under high-shear agitation, the composition was wet milled to a median particle size of about 2 µM using zirconia beads to create a mill base. The hydroxyethyl cellulose solution was then added to the mill base.

Example 2-Compatibility of Various Thickener Systems of Composition 1 with Roundup Powermax®

Method

Composition 1, from Table 1 above, and the formulation of Table 2 of WO/2017/083409 A2 to NuFarm Americas, Inc. ("Formulation X") was formulated with various thickener systems and then analyzed for rheological properties, subjected to 2 weeks at 54° C., to determine long-term storage stability. Compositions 1A-1M and Formulation X were also tested for physical compatibility with Roundup Powermax®. The physical compatibility test was carried out as follows: 96 milliliters ("mL") of water and 5 mL of Roundup Powermax® were charged and mixed in a 100-mL graduated cylinder. 1 mL of the composition of the present invention was charged therein, mixed by inverting the cylinder 30 times and then left at room temperature for 24 hours. After 24 hours, the dispersion was re-mixed by inverting the cylinder 30 times and passed through a 150 µm-sieve. Compatibility was evaluated by observing if any aggregations were observed (incompatible) or not (compatible) on the sieve. Results from these analyses can be seen in Tables 3 and 4, below.

TABLE 3

| Various Thickener Systems for Compositions 1 | | | | | | | | | | | | | |
|---|---|---|---|---|---|---|---|---|---|---|---|---|---|
| Composition | 1A | 1B | 1C | 1D | 1E | 1F | 1G | 1H | 1I | 1J | 1K | 1L | 1M |
| Hydroxyethyl cellulose | 0.10 | 0.10 | 0.10 | 0.15 | 0.15 | 0.15 | 0.15 | 0.15 | 0.20 | 0.30 | 0.15 | — | 0.15 |
| Silicon dioxide | 1.0 | 1.5 | 1.5 | 0.50 | 1.0 | 1.0 | 1.5 | 2.0 | 1.0 | 1.0 | — | 3.0 | — |
| Aluminum oxide | 0.20 | 0.30 | 0.75 | 0.10 | 0.20 | 0.50 | 0.30 | 0.40 | 0.20 | 0.20 | — | 0.60 | — |
| Magnesium aluminum silicate | — | — | — | — | — | — | — | — | — | — | 1.0 | — | — |
| Attapulgite Clay | — | — | — | — | — | — | — | — | — | — | — | — | 1.0 |
| Roundup Powermax ® Compatibility | Yes | Yes | Yes | Yes | Yes | Yes | Yes | Yes | Yes | Yes | Yes | Yes | Yes |
| Storage at 54° C. (2 weeks) | Flow | Flow | Flow | Flow | Flow | Flow | Flow | Flow | Flow | Flow | Flow | Gel | Flow |

Cellosize® QP 100 MH is used as the source of hydroxyethyl cellulose and is available from Dow Chemical Company.

Aerosil® 200 (CAS #112 945-52-5, 7631-86-9) is used as the source of silicon dioxide and is available from Evonik Industries.

Aeroxide® Alu C (CAS #1344-28-1) is used as the source of aluminum oxide and is available from Evonik Industries.

Veegum® R (CAS #1302-78-9) is used as the source of magnesium aluminum silicate and is available from Vanderbilt Minerals, LLC.

RESULTS

Composition 1L, which does not contain hydroxyethyl cellulose, was found to gel upon storage at 54° C. demonstrating poor storage stability. Further, Formulation X was found to produce precipitates when blended with Roundup Powermax®. Unexpectedly, all thickener systems containing hydroxyethyl cellulose and inorganic compounds were compatible with Roundup Powermax® and flowable upon storage at 54° C.

What is claimed is:

1. A mixture comprising glufosinate or salts thereof and an aqueous herbicidal suspension composition comprising:
    about 44% w/w flumioxazin;
    about 4.5% w/w of a first component comprising about 35% w/w of an acrylic graft copolymer, wherein w/w of an acrylic graft copolymer denotes weight by total weight of the first component;
    about 3.0% w/w of a potassium salt of polyoxyethylene tristyrylphenol phosphate;
    about 0.10% w/w of a silicone emulsion;
    about 0.050% w/w of a second component comprising about 19.3% w/w of 1, 2-benzisothiazolin-3-one, wherein w/w of 1,2-benzisothiazolin-3-one denotes weight by total weight of the second component;
    about 7.0% w/w propylene glycol;
    from about 0.15% to about 0.30% w/w hydroxyethyl cellulose;
    from about 0.50% to about 2.0% w/w silicon dioxide; and
    from about 0.10% to about 0.75% w/w aluminum oxide, wherein w/w denotes weight by total weight of the composition unless otherwise indicated.

2. A method of controlling a weed comprising applying the mixture of claim 1 to the weed or an area in need of weed control.

3. A tank mix comprising glufosinate or salts thereof, water and an aqueous herbicidal suspension composition comprising:
    about 44% w/w flumioxazin;
    about 4.5% w/w of a first component comprising about 35% w/w of an acrylic graft copolymer, wherein w/w of an acrylic graft copolymer denotes weight by total weight of the first component;
    about 3.0% w/w of a potassium salt of polyoxyethylene tristyrylphenol phosphate;
    about 0.10% w/w of a silicone emulsion;
    about 0.050% w/w of a second component comprising about 19.3% w/w of 1, 2-benzisothiazolin-3-one, wherein w/w of 1,2-benzisothiazolin-3-one denotes weight by total weight of the second component;
    about 7.0% w/w propylene glycol;
    from about 0.15% to about 0.30% w/w hydroxyethyl cellulose;
    from about 0.50% to about 2.0% w/w silicon dioxide; and
    from about 0.10% to about 0.75% w/w aluminum oxide, wherein w/w denotes weight by total weight of the composition unless otherwise indicated.

4. A method of controlling a weed comprising applying the tank mix of claim 3 to the weed or an area in need of weed control.

* * * * *